United States Patent [19]

Rath

[11] 4,137,943
[45] Feb. 6, 1979

[54] DIAPHRAGM VENT VALVE FOR FLUID STORAGE TANK WITH VAPOR RECOVERY SYSTEM

[76] Inventor: Michael B. Rath, 4789 Detroit Rd., Lorain, Ohio 44054

[21] Appl. No.: 829,220

[22] Filed: Aug. 31, 1977

[51] Int. Cl.² ............................................. F16K 45/00
[52] U.S. Cl. .................... 137/587; 137/586; 251/61.4; 220/85 P
[58] Field of Search .............. 137/586, 587, 589, 553, 137/557; 251/61.4; 220/85 P, 85 VR, 85 VS, 86 R

[56] References Cited

U.S. PATENT DOCUMENTS

| | | | |
|---|---|---|---|
| 2,718,239 | 9/1955 | Erbguth | 137/586 |
| 2,748,799 | 6/1956 | Rath | 137/587 |
| 3,770,011 | 11/1973 | Muehl | 137/587 |
| 3,854,623 | 12/1974 | Pierson | 137/382 X |
| 3,995,871 | 12/1976 | Vornberger | 220/85 P X |

*Primary Examiner*—William R. Cline
*Attorney, Agent, or Firm*—Alfred D. Lobo

[57] ABSTRACT

A tank for volatile fluid is fitted with a diaphragm vent valve as an integral portion of a system in which both emission control regulations and safety regulations are met.

Vapors are recovered in this system but more importantly, the tank such as the one on a tank truck, cannot be filled through a bottom loading valve normally provided near the bottom of the tank, unless the vent valve is open. The vent valve includes a disc which, when the vent valve is closed, sealingly engages the interior upper surface of the tank, and when opened, is pushed away from the interior upper surface. This design provides for a low exterior profile of the valve body, and a valve operable with relatively low air pressure.

8 Claims, 6 Drawing Figures

DIAPHRAGM VENT VALVE FOR FLUID STORAGE TANK WITH VAPOR RECOVERY SYSTEM

BACKGROUND OF THE INVENTION

Gasoline, xylene, methylbutyl ketone, pentane, and other volatile inflammable liquids as well as many volatile liquids which are not inflammable, are conventionally transported in a tank truck having a tank shell into which the liquid is charged or bottom loaded, through a large capacity bottom loading valve. The liquid is transferred from a storage tank at high rates in the range from 100 gallons per minute (gpm) to about 1500 gpm or more. When the tank is being charged, the liquid displaces a large quantity of vapor from within the tank, and it is necessary, particularly in many metropolitan areas, to collect and return the displaced vapor to the storage tank through an emission collection hood which is fitted over a vent in the top of the tank shell. The importance of the vent valve being open when the tank shell is being charged extends to any tank shell whether mobile or stationary.

Safety precautions, particularly in the event of an accidental rollover of the tank truck, require that nothing protrude above overturn rails provided on the tank. Some pertinent regulations are set forth in U.S. Pat. No. 3,854,623 and, in more detail, in the U.S. Dept. of Transportation Regulations, which are hereby incorporated by reference as if fully set forth herein. It is therefore especially important to construct a valve with a low exterior profile.

Moreover, as stated in U.S. Pat. No. 3,854,623, there are many tanks in service fitted with hoods having a high profile, or overturn rails of insufficient height to use presently available hoods. U.S. Pat. No. 3,854,623 was directed to cope with the problem of non-specification, easily damaged hoods, by providing a collapsible resilient hood of a plastic material. My invention is directed to a solution of a different problem namely, inadvertently rupturing the tank shell during charging, comprising replacing the vent valve in the hood, whether now-too-high or not, with a novel diaphragm vent valve. Even an existing now-too-high hood fitted with the diaphragm vent valve of this invention is acceptably safe, and it is unnecessary to modify now-too-low overturn rails, because the vent valve opens into the tank shell.

U.S. Pat. No. 3,752,355 utilizes an inward opening vent valve on a tank, for a different function which requires a different structure. U.S. Pat. No. 1,666,935 discloses a vent valve opening inwardly into a tubular base mounted on a tank shell; again, the vent valve functions differently from my valve and has a different structure.

Those skilled in the art will recognize that the tank shell of a tank truck is not primarily designed as a pressure vessel, and if the vent valve is inadvertently left closed while the tank is being charged, the tank will rupture, and the result can be a catastrophe. In present systems the liquid being charged into the tank hydraulically actuates the vent, or the vent is opened mechanically and usually manually, or the vent is opened with compressed air or by a buildup of vapor pressure in the tank. Irrespective of how the vent is opened, in a typical construction, the loading valve of a storage tank or the bottom loading valve of a tank truck is prevented from being inadvertently opened by a heavy spring in cooperation with a mechanical detent. The mechanical detent is first manually released before the bottom loading valve may be opened. Examples of this construction are seen in valves distributed by Parker, Shanangurs, Philadelphia Valve, Emco-Wheaton, and Allegheny Valve. None of the systems has a vent valve assembly-bottom loading valve detent interlock, and none guarantees that the tank truck cannot be charged unless the vent valve is open. Presently used charging systems have an interlock which provides for automatically opening the vent valve when liquid is charged through the bottom loading valve, but the tank shell can be charged even if the vent valve fails to open. More specifically no present system guarantees the bottom loading valve cannot be opened unless the vent valve is open.

SUMMARY OF THE INVENTION

It is a general object of this invention to provide a novel vent valve mounted atop a tank shell, the valve utilizing a flexible diaphragm, and an associated sealing disc which opens inwardly into the tank shell.

It is also a general object of this invention to provide a vent valve assembly with a low profile atop a tank shell, enabling the valve to be used on existing tank shells with relatively low overturn rails.

It is a further general object of this invention to provide a vent valve assembly operated by the air system of a conventional tank truck; the vent valve is integrated with the air system in such a manner that the tank shell cannot be charged unless the vent valve is open; and valving means are provided in the air system so that the tank shell cannot be charged if the air system pressure is insufficient to open the vent valve.

Briefly, the foregoing objects are accomplished by utilizing a spring-biased diaphragm in a valve body in which is centrally mounted a spring-biased stem carrying a disc adapted to seat against the upper interior wall of the tank shell. The stem is provided with an interior axial recess adapted to receive a guide-post or guide on which the stem is reciprocable. The guide is provided with crossed interior bores through which air passes to open a slave detent prior to charging the tank truck, and through which air is exhausted after the tank truck is charged. The vent valve is operable at air pressures in the range from about 1 psig to about 500 psig, and for a conventional tank truck, the range from about 50 psig to about 150 psig (pounds per square inch gauge).

More specifically, this invention is directed to a diaphragm vent valve which is operated by the air system of a tank truck rather than by the entry of liquid being charged to the tank. The vent valve and related air system may be used to free a detent which can be used with conventional bottom loading valves, is simple in design, economical to manufacture, and easy to service.

Other objects and advantages of the invention will be apparent from the following description taken in conjunction with the drawings, wherein:

DETAILED DESCRIPTION OF A PREFERRED EMBODIMENT OF THE INVENTION

The diaphragm vent valve assembly and vapor recovery system of this invention is described with particular reference to its use on a tank truck such as is conventionally employed to transport gasoline, paint thinners, and other volatile, and often highly inflammable liquids. It will be readily apparent that the system may be used for charging storage tanks of other descriptions, where similar precautions and difficulties lie, provided of course there is available a source of pressurized gas, such as air. If the vapor of the liquid being charged reacts with air, under charging conditions, it will be necessary to use a gas which is unreactive with the vapor, such as an inert gas, for example nitrogen, which would be conveniently stored in sufficient quantity for operation of the system. In most cases, air may be used, and typically, a tank truck has a built-in air system including a compressed air storage tank from which the air brakes and other air-powered accessories are operated. Regardless of the specific manner in which it is accomplished, it is essential that volatile liquid be prevented from being charged to a tank shell from a storage tank in which it is stored, unless the vent on the tank shell is open.

Figure 1:
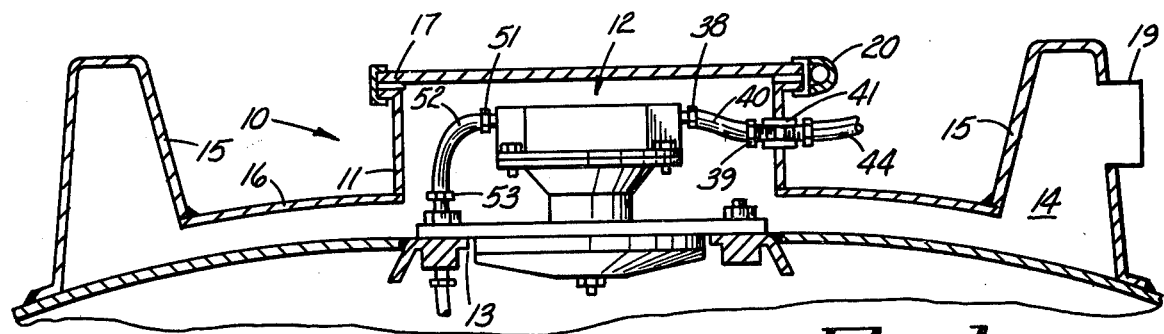
FIG. 1 is a side elevational view, with portions broken away, of the top of a tank shell such as is used on a tank truck, diagrammatically illustrating a vapor recovery system including a diaphragm vent valve assembly, overturn rails and collection hood.

Referring now to the drawings there is shown in FIG. 1 a portion of the top of a tank shell indicated generally by reference numeral 10 including a collection hood 11 which completely encloses a vent valve assembly, indicated generally by reference numeral 12, removably disposed in a top opening or vent 13. Vapor of the liquid charged to the tank during a loading operation is allowed to escape from the vent 13, as will be more fully described hereinafter into the hood 11, and thence into a confined zone or plenum 14 which extends above the tank shell between and under generally parallel, spaced-apart overturn rails 15 which straddle the top of the tank shell. A deck 16 connects hood 11 and overturn rails 15. Either the hood 11 and/or the overturn rails 15 is provided with a large valved outlet 19 through which vapor in the plenum 14 may be ducted to a vapor recovery tank (not shown). The hood 11 is provided with a removable lid 17, clamped to the vertical walls of the hood by a retaining clamp 20, which lid permits access to the vent valve assembly 12.

Figure 2:
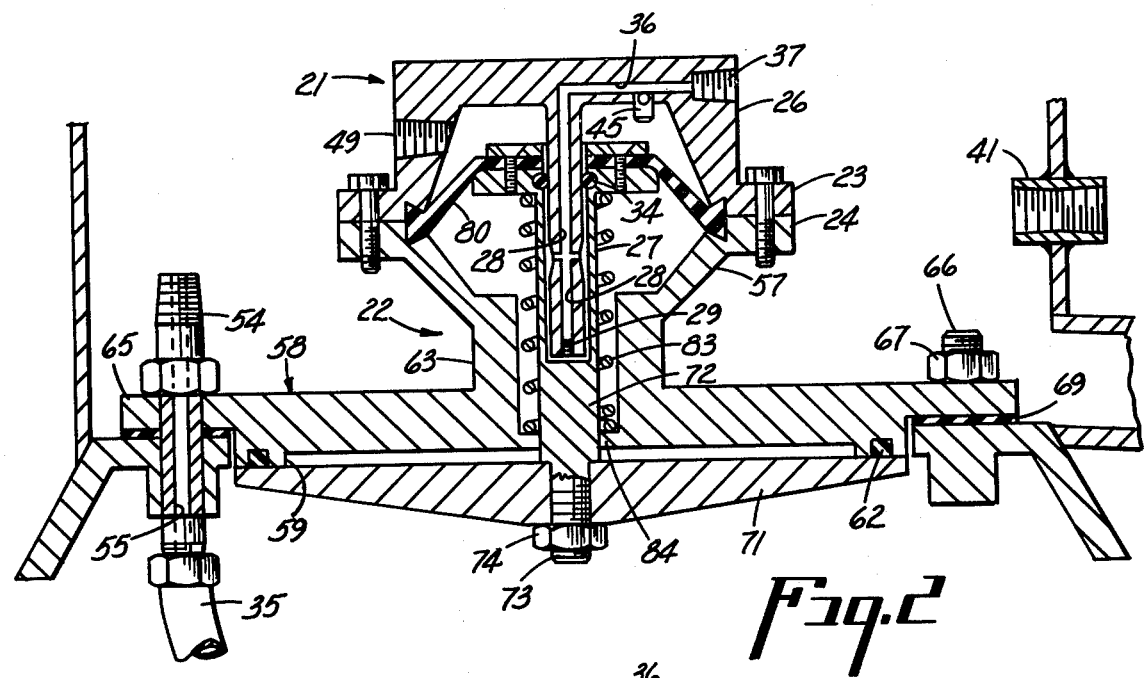
FIG. 2 is a cross-sectional view, in side elevation, of the diaphragm vent valve assembly showing the vent in the closed position.
Figure 3:
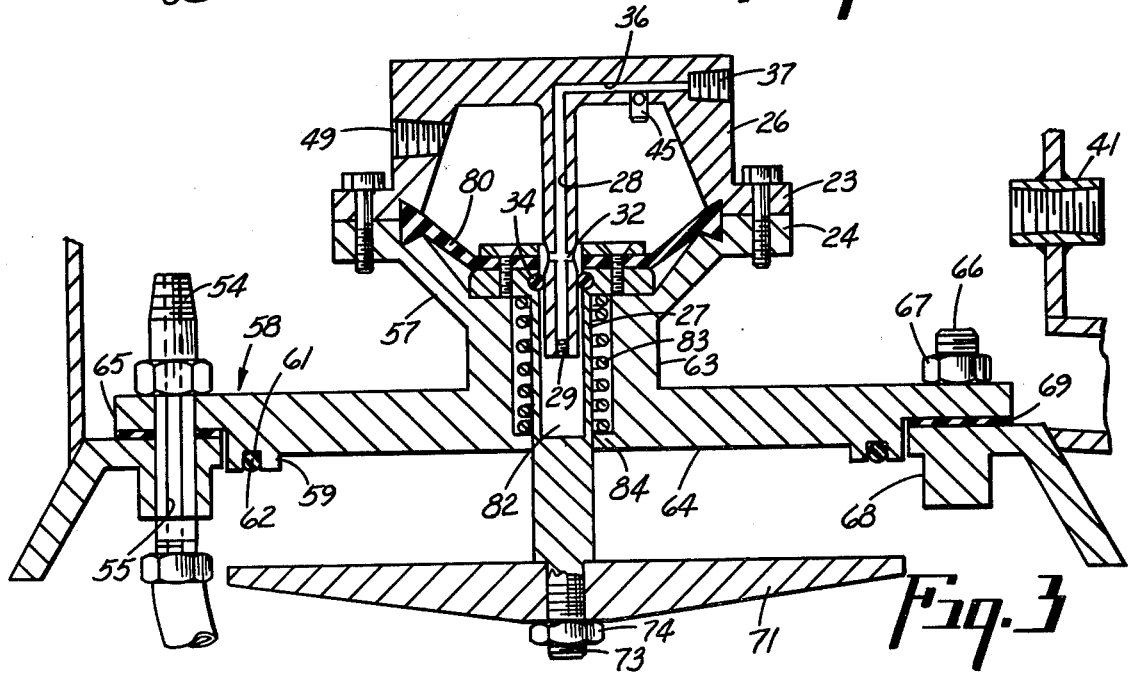
FIG. 3 is a cross-sectional view, in side elevation, of the diaphragm vent valve assembly showing the vent in the open position.
Figure 4:
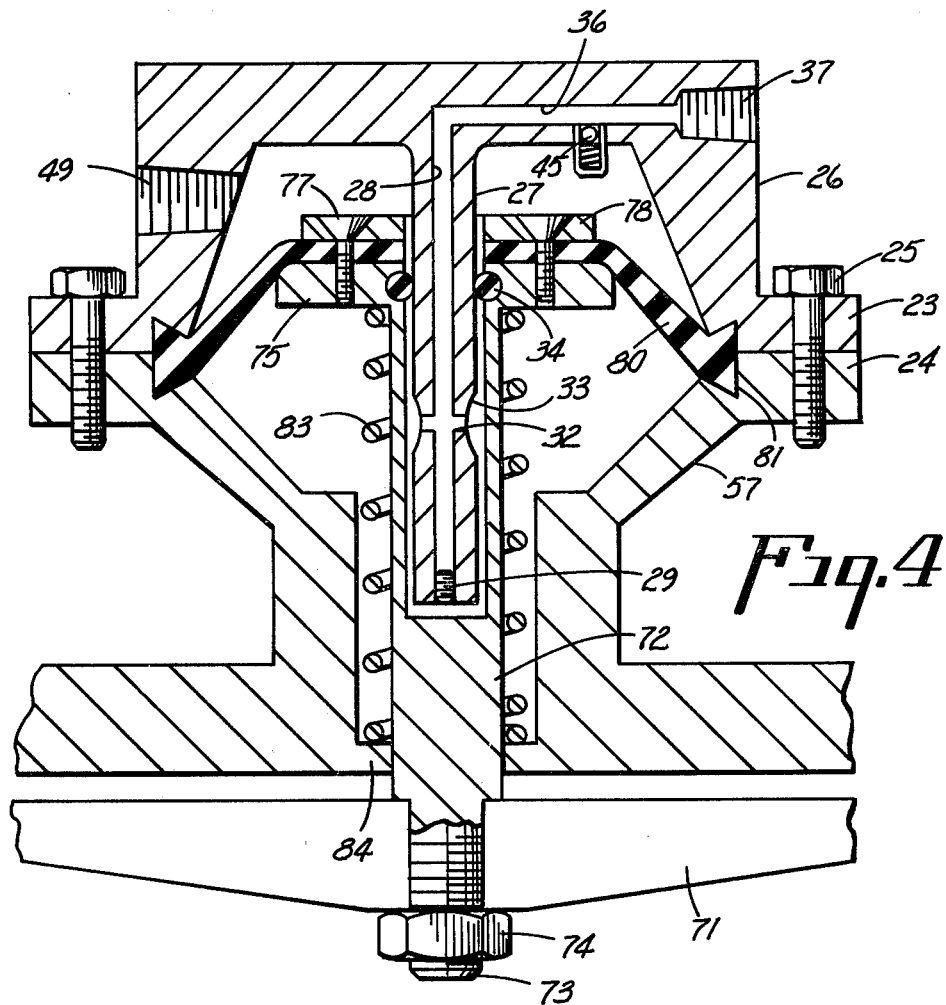
FIG. 4 is an enlarged view of particular parts of the vent valve assembly.
Figure 5:
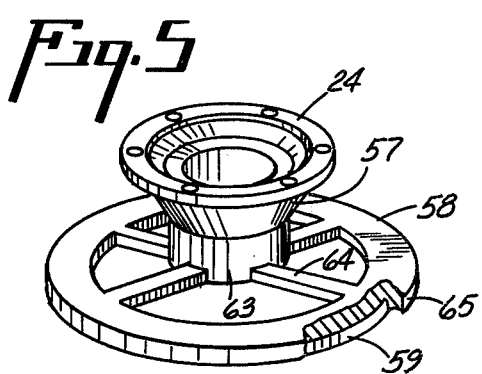
FIG. 5 is a top perspective view of the lower body member of the vent valve.

As seen more clearly in FIGS. 2 and 3 the vent valve 12 comprises a two-piece valve body including an upper body member 21 and a lower body member 22 which are conjoined by associated peripheral outwardly projecting flanges 23 and 24 respectively and fastening means such as plural machine bolts 25 inserted through flange 23 and threadedly secured in flange 24. Both the upper body member 21 and the lower body member 22 are preferably cast from a suitable metal such as aluminum or brass, or a suitable liquid vapor resistant plastic such as nylon, and then finished-machined to final tolerance so that they are interchangeably usable. These body members 21 and 22 are separately illustrated in FIG. 4 which is an enlarged view digrammatically illustrating particular essential components. The upper body member 21 comprises a generally U-shaped dome 26 which terminates in the upper body flange 23. From the center of the dome 26 there projects an elongated guidepost, hereinafter referred to as a guide 27, which is preferably cast as an integral part of the upper body member 21. The guide 27 is provided with a longitudinal axial bore or first passage 28 which is plugged at the end of the guide with a plug 29. Intermediate the length of the guide 27 and near the end, there is provided a transverse bore or second passage 32 which communicates with the longitudinal passage 28, substantially orthogonally thereto, and passage 32 terminates at each end in a shallow circumferential groove 33 cut in the guide to permit an elastomer O-ring 34, to slide up and down, past the passage 32, as will be described hereinafter.

The dome 26 is provided with a radial bore or third passage 36 which is in open communication with the longitudinal bore 28 at the center of the dome. The radial bore 36 terminates at the outer surface of the dome in a first thread cavity 37 adapted to threadedly engage, in fluid-tight engagement therewith an air hose fitting 38 at one end of a first air hose 40. The other end of the air hose 40 is provided with another air hose fitting 39 which is air-tightedly secured in a threaded coupling 41 provided in the vertical wall of the hood 11. The coupling 41 couples air hose 40 to a second air hose 44, shown broken away, which hose places the passage 36 in open communication with a detent releasing means 30, shown in FIG. 6, which locks the bottom loading valve 31 in the closed position with a detent 43, unless the vent 13 is open, as will be explained in greater detail hereinafter.

The dome 26 is provided with a check valve means such as a ball check valve 45 in its interior upper surface so as to place the radial passage 36 in selective open communication with the interior of the dome. When the selector valve is of the type which simultaneously shuts off the air supply to the valve 12 and vents the air lines to and from the valve, the ball check valve 45 permits the interior of the dome 26 and the air line to the detent release means to be vented, after the tank shell is charged, the air supply to the valve 12 is shut off, and the vent valve commences to return to its normally closed position.

Figure 6:
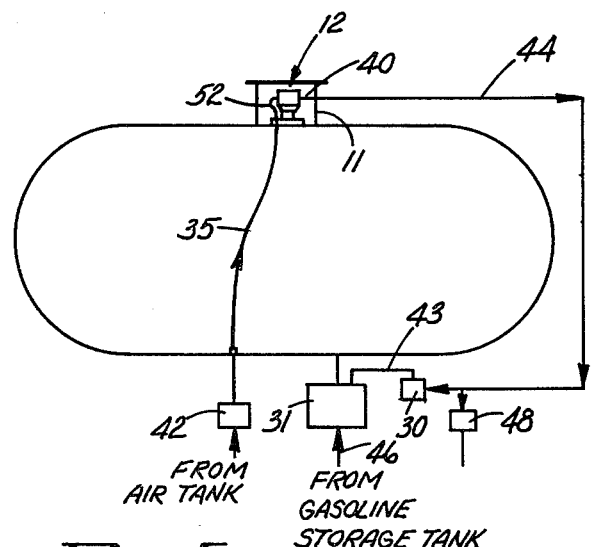
FIG. 6 is a schematic illustration of the system for charging a tank shell.

The dome 26 is further provided with a second threaded cavity 49, preferably diametrically oppositely disposed relative to the first cavity 37 and similarly adapted to threadedly engage an air hose fitting 51 at one end of an air hose 52. The other end of air hose 52 carries an air hose fitting 53 which is threadedly secured to one end of a stud-nipple 54 having an axial passage 55 which places the interior of the dome 26 in open gaseous communication with the source of air to the shell An air hose 35, shown broken away in FIG. 2, connects a selector valve 42 (see FIG. 6) to the stud-nipple 54, to supply pressurized air to the interior of dome 26, and for convenience, the air hose 35 is inside the tank shell. A typical selector valve such as is provided on the air manifold of a tank truck vents the air line as the valve is closed. For clarity, a separate selector valve 42 and a separate purge valve 48 (as shown in FIG. 6) are provided so that air will rush out noisily from the purge valve, if it is open, when the selector valve is opened.

The lower body member 22 comprises (a) a generally dish-shaped or funnel-shaped arcuate member having an upper conical portion 57 terminating around its rim in the lower body flange 24, (b) a lower annular ring member 58 having a circumferential shoulder 59 of a width sufficient to allow a circumferential groove 61 to be provided therewithin to accomodate an elastomer O-ring 62, and (c) an intermediate cylindrical member 63 centrally connecting the upper conical portion 57 with the lower annular ring 58. Plural radial ribs 64 maintain the annular ring 58 in spaced-apart relationship with the central cylindrical member 63, and it will be appreciated that the lower body member 22 including the ribs 64 is preferably cast as a unit. The annular ring member 58 includes a peripheral flange 65 provided with circumferentially spaced-apart stud holes through which studs 66 are inserted, and the vent valve 22 is secured to the tank shell 10 with nuts 67. The studs 66 are typically provided in a standard stud circle about 7.5 in diameter in which about 8 studs are equidistantly located. It is desirable to provide an annular vent flange 68 in the tank shell 10, and the upper surface of the vent flange is machined smooth, as is the associated lower surface of the peripheral flange 65, and a flat ring gasket 69 is used therebetween. Coaxially longitudinally disposed within the lower body member 22 is a valve member 70 which includes a disc 71 and a T-shaped stem 72, having a threaded end 73 which, near the end thereof, axially secures the disc 71 with a nut 74. The upper surface of the disc 71 is sealingly engaged against the elastomer O-ring 62 so as to seal the vent 13, as shown in FIG. 2. When the disc 71 is forced away from the O-ring 62, as shown in FIG. 3, the vent valve 12 is opened and vapors are free to escape from the interior of the tank shell, through the radially ribbed area of the lower body member 22, and into the hood 11.

The T-shaped stem 72, near its other end that is remote from the threaded end 73, has a button-head, hereinafter referred to as a button 75 provided with plural circumferential threaded holes in which machines screws 77 are threadedly engaged. The machine screws 77 are disposed in an annular plate 78 which secures a flexible diaphragm means, such as a circular elastomer diaphragm 80, to the upper surface of button 75. The periphery of the diaphragm 80, preferably radially thickened so as to present a generally wedge-shaped cross-section, is removably secured between the upper and lower body members in a tapered peripheral groove 81 therebetween. The diaphragm is thus tightly confined and secured so that it can be repetitively displaced from an upper position, when the vent valve is closed, to a lower position when the vent valve is opened, without coming loose.

The stem 72 is provided with an axial blind recess 82 which opens at the upper surface of button 75 and extends longitudinally within the stem; the axial recess 82 slidably accomodates the guide 27 upon which the stem 72, and hence the disc 71, is reciprocably disposed. The depth of the recess 82 is sufficient to permit the disc 71 to be securely seated against O-ring 62. The recess is conveniently provided by drilling into the stem up to a preselected depth.

A compression spring 83 is located in lower body member 22, about the stem 72, one end of the spring engaging the button 75, and the other end of the spring engaging an annular shoulder 84 provided in the central cylindrical member 63 of the lower body member 22. The function of the spring 83 is to seat the disc 71 against the O-ring 62, and it will be recognized that any biasing means for example a compressible bellows, or plural flexible struts, may be used in place of the compression spring.

In the button 75, there is provided, in the inner vertical wall thereof, an inner peripheral groove in which the elastomer O-ring 34 is confined. The O-ring is preferably of the permanently lubricated type so as to allow it to slide up and down the guide 27 while snugly engaged thereupon. When the vent valve is closed, that is in "closed position," the O-ring 34 is above the traverse through-passage 32; when the vent valve is open, "the open position", the O-ring 34 is below the passage 32, and, as will be evident, the compression spring 83 will be compressed and the disc 71 is displaced inwardly within the interior of the tank shell.

Referring now to FIG. 6 there is shown a schematic illustration of the system of this invention, as used on a tank shell 10, utilizing the novel diaphragm vent valve 12 which is an essential element of the system. The system is placed in operation, by connecting the intake side of a preselected bottom loading valve 31 of a tank truck to the charging line 46 of the storage tank from which gasoline, or other liquid, is to be charged. Typically this charging line 46 is a flexible hose with couplings, and the discharge valve (not shown) of the storage tank is closed. The selector valve 42, when opened, places the vent valve 12 in communication with the pressurized air system of the tank truck through air line 47 which is often located within the tank shell 10, and connected to stud-nipple 54. Compressed air thus passes through the line to stud-nipple 54 and thence to the vent valve 12. Referring now to FIGS. 2 and 3, under normal circumstances, when there is a predetermined adequate air pressure in the range from about 50 psig to about 150 psig, sufficient force is exerted on the diaphragm 80 to force it downwards on the guide 27. The O-ring 34 slides past the transverse through-passage 33 permitting air to pass through it and into passages 28 and 36, so that air is then ducted through air hose 44. The air hose 44 is operatively connected to the slave detent releasing means 30 which must release the detent 43 before the bottom loading valve 31 is opened. Any conventional pneumatically actuated slave detent releasing means may be used, for example, such as an interlock 3-way Allegheny valve No. 20768. The air from hose 44 releases the detent 43 and permits the operator to open the bottom loading valve 31. If the air pressure is insufficient to force the diaphragm 80 down, and the O-ring 34 below the passage 33, there is also insufficient air pressure in air line 44 to release the slave detent 43. The operator then knows that the vent valve 12 is not opened, and cannot charge the tank shell.

When under adequate pressure conditions, the tank shell is charged in the normal manner, the valve on the storage tank is shut off, and then the selector valve 42 is closed. If closing the selector valve 42 does not simultaneously purge the pressurized air trapped in the air lines and in the vent valve, the system may be purged by opening a purge valve 48 and a ball check valve would be provided in the air line 47 or in the threaded cavity 49, to enable the air line 47 to be vented. If desired separate purge valves may be provided on the air lines on each side of the vent valve making it unnecessary to provide a check valve means in the vent valve assembly. As the pressure within the dome 26 returns to atmospheric, the compression spring biases the stem and disc upwards, the O-ring 34 moves up past the transverse paysage 32 and the disc 71 is securely seated against O-ring 62. It will be evident that when the vent valve is in the closed position, the diaphragm 80 is floating, that is it is not stressed, the spring being so chosen as to exert very little pressure against the bottom when the spring is in its essentially fully extended position. Thus, the diapragm is under stress only when charging the tank shell. This contributes to the longevity of the diaphragm. Since the other elements of the vent valve assembly are simple and rugged, the design of this vent valve assembly is the essence of simplicity, yet the system is unequivocally reliable. It will be noted that in this closed position, even an accidental overturning of the tank truck which forces liquid against the disc 71 will not open the vent valve but seat it more tightly.

Sequence of Vent Operation and Function of Check Valve

Open the selector valve 42, which is normally closed, to charge the vent valve 12 through lines 35 and 52. Compressed air enters the vent valve and forces diaphragm 80 downwards. This displaces disc 71 and opens the vent valve. When the O-ring 34 moves past circumferential groove 33, compressed air passes through transverse passage 32, through the longitudinal axial bore 28, through air hose 44 to the detent releasing means 30. The detent releasing means 30 normally locks the bottom loading valve 31 in the closed position. The valve 31 may be opened only when there is sufficient air pressure to actuate the detent releasing means.

When the vent valve 12 is charged with compressed air, the ball of the check valve is forced into the closed position permitting the vent valve 12 to operate as described hereinabove. After the bottom loading of the tank is completed, bottom loading valve 31 is closed. This permits air to be purged from the upper body of vent valve 12, through lines 52 and 35 and out from the bottom loading valve 42 which is conventionally provided with means for purging the air.

When the air is purged from the upper body of the vent valve, the spring 83 will return the diaphragm 80 to its normal position, thus moving O-ring 34 upwards past transverse passage 32 which is thus sealed off from the interior of the upper body and the air hose 44, in which air is trapped. The pressure of the trapped air forces the ball of the check valve off its seat, and allows the trapped air to be purged from the system. This purging could also be effected by a separate purge valve in line 44, but the ball check valves makes it more convenient, and automatic.

I claim:

1. In a system for charging volatile liquid from a first liquid storage tank to a second liquid storage tank such as a tank truck including (a) a tank shell having a vent (b) a collection hood atop said vent connected to hollow overturn rails straddling said tank shell which together define a plenum from which vapor of said liquid is recovered, (c) a vent valve assembly disposed in said vent under said hood to place the interior of said tank shell in selective open communication with said plenum, (d) a loading valve for loading said tank shell and, (e) detent release means having a detent operatively associated with said loading valve to prevent said loading valve from being opened without releasing said detent means, the improvement comprising,
   (i) a selector valve for gas to said vent valve assembly, said selector valve being in selective open communication with a source of pressurized gas, and in open communication with said vent valve assembly,
   (ii) pneumatically actuatable detent release means in open communication with said vent valve assembly,
   (iii) valve means within said vent valve assembly, said valve means being responsive to a minimum preselected gas pressure sufficient to displace a flexible diaphragm, so as to open said vent, and to place said selector valve in open communication with said detent release means, whereby said detent is released and said loading valve may be opened only if said vent is open.

2. The system of claim 1 including, in addition, (iv) purge valve means to purge gas from the system after said tank shell is charged.

3. The system of claim 1 wherein said gas pressure is in the range from about 1 psig to about 500 psig.

4. The system of claim 3 wherein said gas is air, and said air is supplied at a pressure in the range from about 50 psig to about 150 psig.

5. A vent valve assembly comprising a hollow upper body member, a hollow lower body member and flexible diaphragm means securely interposed therebetween to provide a gas-tight partition between said upper and lower body members; said upper body member having a first passage to supply pressurized gas to the interior thereof, and a second passage for said gas exiting said upper body member, in valved communication with said first passage; valve means coaxially longitudinally disposed within said lower body member, said valve means including a disc, and T-shaped stem secured thereto; said flexible diaphragm being centrally secured to said stem which is movable with said diaphragm; a guide projecting centrally from said upper body, said guide having longitudinal and transverse bores in open internal communication, said stem being reciprocably disposed on said guide; and biasing means in said lower body member to sealingly bias said disc against the lower surface of said lower body member, said biasing means being responsive to a predetermined pressure on said diaphragm means so as to place said first passage means, said transverse and longitudinal bores and said second passage means in open fluid communication with each other.

6. The vent assembly of claim 5 including a check valve which places said second passage in selective open communication with the interior of said lower body member to vent gas under pressure from air lines when said disc is returned to its position sealingly biased against the lower surface of said lower body member.

7. A vent valve assembly removably disposed in a vent atop a storage tank into which a volatile, liquid is to be charged through a loading valve interlocked with a detent release means, said vent valve assembly comprising,
   (a) an upper body member having a generally U-shaped dome having a through-passage in its wall placing the interior of said dome in open communication with a source of pressurized gas, and projecting centrally from within said dome an elongated guide having
      (i) a longitudinal axial passage plugged at its one end in the guide, and in open communication with said detent release means, and
      (ii) a transverse through-passage in open communication with said longitudinal passage, said transverse passage being proximately disposed relative to the plugged end of the guide;
   (b) a lower body member having (i) a generally arcuate upper portion
(ii) a lower annular ring member having a circumferential shoulder in which is accomodated a first O-ring sealing means, and
(iii) an intermediate cylindrical member centrally connecting said upper portion with said annular ring via plural ribs which maintain said annular ring in spaced-apart relationship with said cylindrical member;
(c) a valve member coaxially longitudinally disposed within said lower body member, said valve member including a disc and a T-shaped stem having a button head, said disc being secured to said stem, said disc having an upper surface which engages said first O-ring means to seal said vent, said T-shaped stem having a blind axial recess in which said guide is slideably accomodated, and second O-ring means in said button head to sealingly engage said guide in gas-tight contact therewith;
(d) flexible diaphragm means centrally secured to said botton head and interposed securely between said upper and lower body members to provide gas-tight separation between the interiors of said upper and lower body members; and,
(e) biasing means to bias said diaphragm means upward and above said transverse passage to seat said disc against said first O-ring means so that said vent is normally closed.

8. The vent valve assembly of claim 7 including check valve means in selective open communication with air lines to and from said upper body member to vent gas under pressure when said diaphragm means is biased upward and above said transverse passage.

* * * * *